US011477990B2

(12) United States Patent
Smith (10) Patent No.: US 11,477,990 B2
(45) Date of Patent: Oct. 25, 2022

(54) CONFECTIONERY DISPENSING GARMENT

(71) Applicant: Tod Smith, Los Angeles, CA (US)

(72) Inventor: Tod Smith, Los Angeles, CA (US)

( * ) Notice: Subject to any disclaimer, the term of this patent is extended or adjusted under 35 U.S.C. 154(b) by 162 days.

(21) Appl. No.: 16/645,296

(22) PCT Filed: Sep. 5, 2018

(86) PCT No.: PCT/US2018/049539
§ 371 (c)(1),
(2) Date: Mar. 6, 2020

(87) PCT Pub. No.: WO2020/050836
PCT Pub. Date: Mar. 12, 2020

(65) Prior Publication Data

US 2021/0186047 A1 Jun. 24, 2021

(51) Int. Cl.
*A23G 3/56* (2006.01)
*A41C 3/00* (2006.01)

(52) U.S. Cl.
CPC ............ *A23G 3/563* (2013.01); *A41C 3/005* (2013.01); *A41C 3/0092* (2013.01)

(58) Field of Classification Search
CPC ............ A23G 3/563; A23G 3/56; A23G 3/00
See application file for complete search history.

(56) References Cited

U.S. PATENT DOCUMENTS

| | | | | |
|---|---|---|---|---|
| 4,120,053 A * | 10/1978 | Nemirofsky | ............ | G07F 11/44 2/115 |
| 5,004,122 A * | 4/1991 | Poynter | ............ | B65D 83/0409 221/266 |
| 5,045,340 A * | 9/1991 | Kohler | ............ | A23G 3/38 426/660 |
| 5,906,846 A * | 5/1999 | Coleman | ............ | A23G 3/563 446/73 |
| 6,125,472 A * | 10/2000 | Nakagawa | ............ | A41D 27/285 2/DIG. 1 |
| 6,872,119 B2 * | 3/2005 | Brink | ............ | A43B 3/0078 2/244 |
| 7,607,965 B1 * | 10/2009 | Frazier | ............ | A61J 15/0011 604/74 |

(Continued)

OTHER PUBLICATIONS

Written Opinion of the International Search Authority for PCT/US2018/049539.

*Primary Examiner* — Jocelyn Bravo
(74) *Attorney, Agent, or Firm* — Obi Iloputaife, Esq.

(57) ABSTRACT

A confectionery dispensing garment is presented. The invention comprises a garment such as a brassiere with one or more cups shaped substantially as a truncated cone with a first small radius opening and a first large radius opening. The first small radius opening is sized to substantially expose a wearer's nipple. A truncated conic housing with a second small radius opening and a second large radius opening is removably couplable to the garment. The first small radius opening and the second small radius opening are sized substantially the same. Each truncated conic housing is configured to fit over one of the one or more cups of the brassiere such that the second small radius opening aligns with the first small radius opening to expose the wearer's nipple. One or more substantially torus shaped confectionery units is removably coupled to an outside surface of said truncated conic housing.

9 Claims, 6 Drawing Sheets

(56) References Cited

U.S. PATENT DOCUMENTS

| | | | | |
|---|---|---|---|---|
| 7,927,680 B2* | 4/2011 | Marshall | B44C 1/105 | |
| | | | 156/244.18 | |
| 8,414,353 B1* | 4/2013 | Leavell | A41C 3/04 | |
| | | | 450/36 | |
| 9,060,917 B1* | 6/2015 | Tronson | A61J 11/005 | |
| 9,211,366 B1* | 12/2015 | Gutwein | A61M 1/06 | |
| 2002/0090423 A1* | 7/2002 | Shecter | A23G 3/563 | |
| | | | 426/104 | |
| 2003/0067772 A1* | 4/2003 | Coleman | A23G 3/563 | |
| | | | 362/208 | |
| 2004/0006806 A1* | 1/2004 | Gabriel | A41D 13/0155 | |
| | | | 2/129 | |
| 2004/0181857 A1* | 9/2004 | Brinks | A43B 23/24 | |
| | | | 2/424 | |
| 2006/0288462 A1* | 12/2006 | Schroeder | A23G 3/50 | |
| | | | 426/104 | |
| 2008/0039781 A1* | 2/2008 | Bjorge | A61M 1/062 | |
| | | | 604/74 | |
| 2008/0140194 A1* | 6/2008 | Hansen | A61F 2/52 | |
| | | | 623/7 | |
| 2008/0220916 A1* | 9/2008 | Montgomery | A63B 43/00 | |
| | | | 473/604 | |
| 2008/0243097 A1* | 10/2008 | Goss | A61F 5/453 | |
| | | | 604/349 | |
| 2008/0248170 A1* | 10/2008 | Lee | A23G 3/563 | |
| | | | 426/110 | |
| 2009/0191316 A1* | 7/2009 | Perry | A23G 3/563 | |
| | | | 426/115 | |
| 2009/0285948 A1* | 11/2009 | Tucker | A63H 37/00 | |
| | | | 426/104 | |
| 2013/0284762 A1* | 10/2013 | Voss | A45F 3/16 | |
| | | | 4/616 | |
| 2014/0259295 A1* | 9/2014 | Guglielmo | A43B 1/0027 | |
| | | | 2/245 | |
| 2015/0121956 A1* | 5/2015 | Cifuentes | A23G 3/0055 | |
| | | | 63/1.11 | |
| 2015/0298896 A1* | 10/2015 | McCullagh | A41D 27/08 | |
| | | | 206/575 | |
| 2016/0143315 A1* | 5/2016 | Schuricht | A44B 15/00 | |
| | | | 426/135 | |
| 2017/0209290 A1* | 7/2017 | Birgisdottir | A61F 2/80 | |
| 2017/0325528 A1* | 11/2017 | Bugayong | A41D 27/20 | |
| 2018/0326130 A1* | 11/2018 | Thompson | A41C 3/04 | |
| 2018/0352829 A1* | 12/2018 | Diamond | A44C 9/00 | |
| 2020/0297039 A1* | 9/2020 | Parker | A23G 3/563 | |
| 2021/0289848 A1* | 9/2021 | Andrews | A23G 3/50 | |

* cited by examiner

CONFECTIONERY DISPENSING GARMENT

BACKGROUND OF THE INVENTION

Field of the Invention

Embodiments of the invention relates to the field of wearable foods. More specifically, the invention relates to a confectionery dispensing garment for sexual arousal during foreplay.

Description of the Related Art

Edible garments are well known in the art. These garments usually are usually made to be worn by ladies and are one-use items with components that are edible. Some of these feminine garments serve to produce a visually erotic stimulation in the male partner, but are not configured for stimulation of the female wearer of the garment.

During love making and prior to actual copulation, humans practice certain behavioral mannerisms or foreplay to heighten sexual arousal. One such mannerism is for females to wear intimate edible undergarments which the male partners then eat to visually arouse the female partners. These intimate edible undergarments are considered very sensual, feminine and beautiful by most men and women. Because the material is edible, it heightens passion between the lovers.

All five human senses are involved during lovemaking. The one sense that is most prevalent is the sense of touch. While the wearing of lingerie by a woman while with her mate is exciting and stimulating to both individuals as the feel of the lingerie is transmitted to the pleasure area of the brain, the erotic touching the partner of sensual areas, e.g. breast or genitalia, helps heighten sexual arousal.

BRIEF SUMMARY OF THE INVENTION

One or more embodiments of the invention are directed a confectionery dispensing garment. The confectionery dispensing apparatus that may be worn by a person, e.g. over a woman's breasts or a male genitalia. The garment is configured such that the male or female partner thereof can provide sexual stimulation to the wearer by touch while eating the confectionery off the garment.

One or more embodiments of the invention comprises a brassiere with one or more cups shaped substantially as a truncated cone with a small radius opening and a large radius opening. The large radius opening is sized to fit over the wearer's breast and the small radius opening is sized to substantially expose the wearer's nipple. The small radius opening exposes the nipple and provides access for the sexual partner of the wearer to sensually manipulate the exposed nipple with their fingers or tongue during foreplay, while erotically consuming the confectionery.

One or more embodiments of the invention comprises a confectionery holder with a truncated conic housing removably couplably over a cup of the brassiere. The truncated conic housing comprises a small radius opening (e.g. nipple opening) and a large radius opening. The small radius opening of the housing is sized substantially to coincide with small radius opening of the brassiere. The truncated conic housing is configured to fit over one of the one or more cups of the brassiere such that the small radius opening of the housing aligns with the small radius opening of the brassiere.

One or more embodiments of the invention comprises one or more substantially torus shaped confectionery units removably couplable to an outside surface of the truncated conic housing.

In one or more embodiments, the torus shaped confectionery unit comprises an inner support ring with a plurality of arms for coupling to the truncated conic housing. The inner support ring may be made of reusable material or made of edible material.

In one or more embodiments, the confectionery may be a candy such as sweet or chocolate, a pastry, etc.

In one or more embodiments of the invention, the confectionery holder may be worn without a corresponding garment. For instance, the confectionery holder may be configured to be worn directly over a woman's breast or over a male genitalia. In such embodiments, the confectionery holder may be placed directly in contact with the skin of the wearer.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

The present invention comprising a confectionery dispensing garment will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more embodiments of the present invention will now be described with references to FIGS. 1-11.

One or more embodiments of the present invention comprises a confectionery dispensing apparatus that may be worn by a person, e.g. over a woman's breast or a male genitalia. The garment is configured such that the male or female partner thereof can provide sexual stimulation to the wearer by touch while eating the confectionery off the garment.

Figure 1:
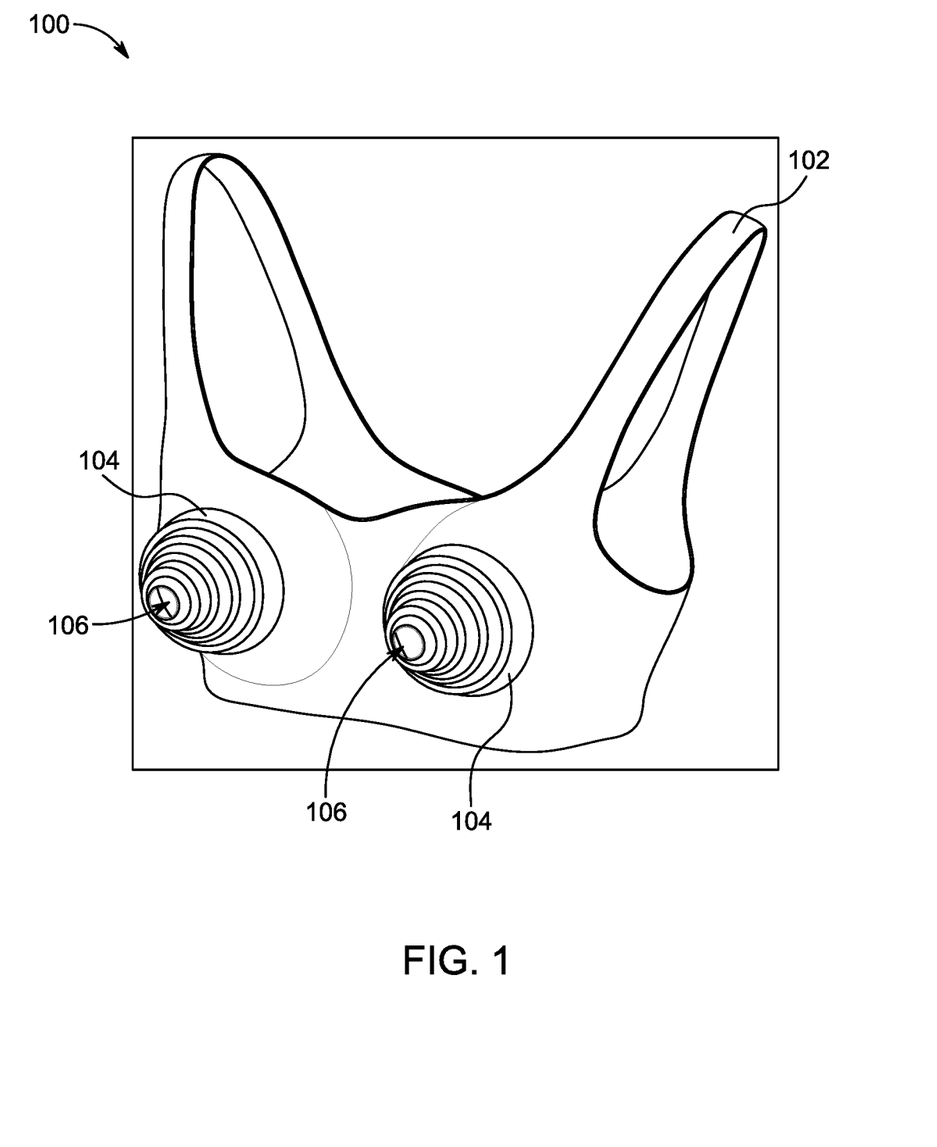
FIG. 1 is an illustration of a confectionery dispensing garment in accordance with one or more embodiments of the present invention.

In one or more embodiments of the present invention, the confectionery dispensing apparatus 100 comprises a garment 102, e.g. a brassiere, and one or more confectionery holders 104. The confectionery holder 104 may be configured to be removably couplable to the garment. For example, the confectionery hold may be couplable to the garment via a fastener or adhesive, or nothing. In one or more embodiments, a hook and loop type fastener with one half of the fastener on the inside of the confectionery hold and the other half of the fastener on the garment may be used to secure the holder to the garment.

In one or more embodiments, the garment comprises a brassiere 102 with an opening 106 for exposing the nipple of the wearer in each cup. Brassiere 102 may be made of regular cloth fabric, silicone, etc. The opening 106 for exposure of the nipple provides access for the sexual partner of the wearer to sensually manipulate the exposed nipple with their fingers or tongue during foreplay, while erotically consuming the confectionery.

Figure 2:
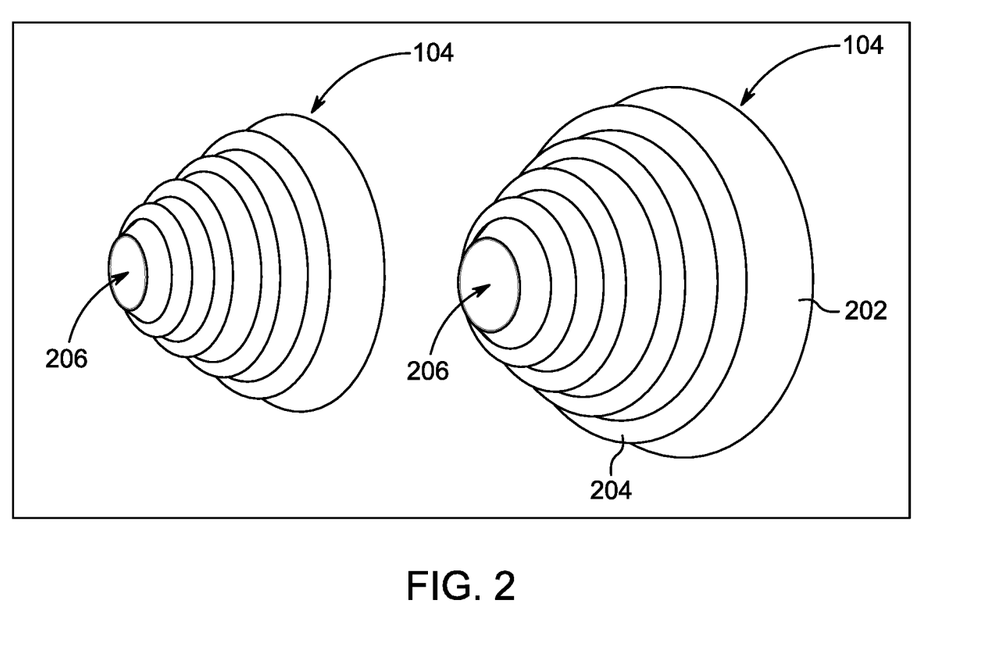
FIG. 2 is an illustration of two confectionery holders of the confectionery dispensing garment in accordance with one or more embodiments of the present invention.

FIG. 2 is an illustration of two confectionery holders 104 of the confectionery dispensing garment in accordance with one or more embodiments of the present invention. As illustrated, each confectionery holder 104 comprises a truncated conic housing 202, with a front opening 206 for exposing the nipple of the wearer in each cup. In embodiments comprising both garment and the holder 104, opening 106 of the garment and opening 206 of the housing align to expose the wearer's nipple. Coupled on the outside surface of housing 202 are one or more substantially torus shaped confectioneries units 204. The one or more torus shaped confectioneries units have varying radius "R" such that each confectioneries unit 204 is in close proximity to the surface of the housing.

In one or more embodiments, the confectionery units may be configured as refillables such that a user that already has the conic housing may purchase different refillable flavors of the confectionery unit and simply couple them to the housing 202. Examples of possible confectioneries 902 include candy such as sweets and chocolates, pastries, etc. or combinations thereof.

Figure 3:
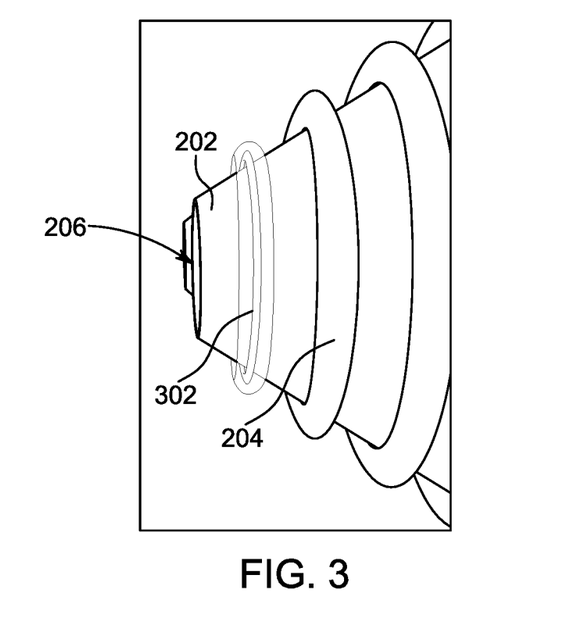
FIG. 3 is a close-up illustration showing the components of the confectionery holder of the confectionery dispensing garment in accordance with one or more embodiments of the present invention.

FIG. 3 is a close-up illustration showing the components of the confectionery holder 104 of the confectionery dispensing garment in accordance with one or more embodiments of the present invention. As illustrated, each confectionery unit includes a ring 302 to maintain structural integrity of the confectionery unit and for coupling the confectionery unit to the housing. As illustrated in more detail in FIGS. 8 and 10, each ring includes one or more anchors 804 for coupling the confectionery to the conic housing.

Figure 4:
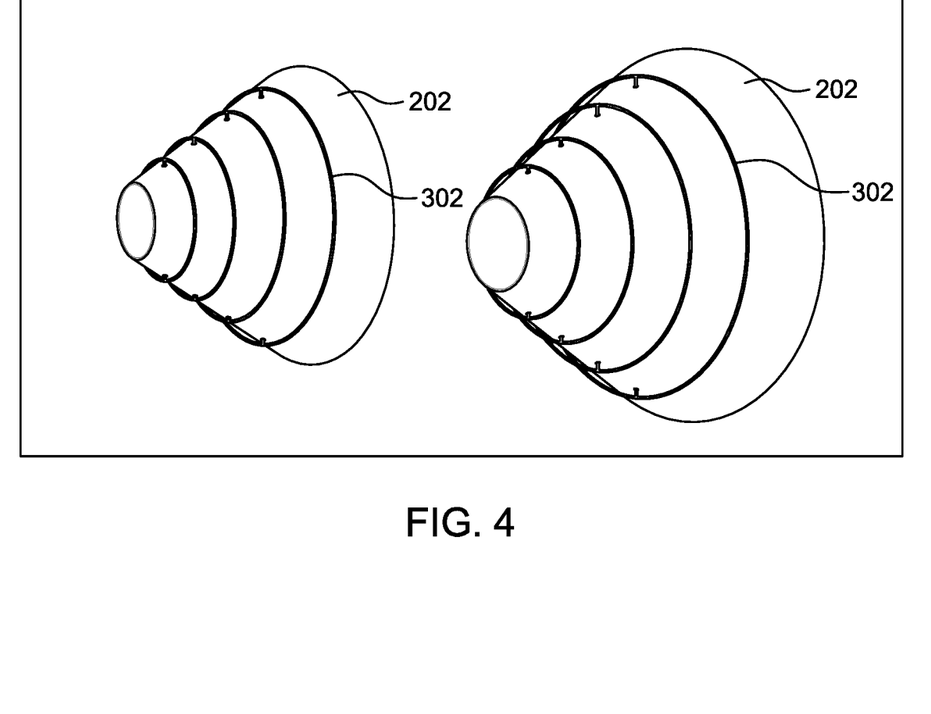
FIG. 4 is an illustration showing the rings of two confectionery holders of the confectionery dispensing garment in accordance with one or more embodiments of the present invention.

FIG. 4 is an illustration showing the confectionery holders of the confectionery dispensing garment with only the rings. This illustration would be what the apparatus looks like when the confectioneries are consumed, for example. As illustrated, each ring is attached to the conic housing by one or more anchors 804 (See FIGS. 8 and 10). Those of skill in the art would appreciate that other means of securing the confectionaries to the conic housing is contemplated. For instance, each conic housing may include mounts on its external surface for mounting the rings or confectionaries.

Figure 5:
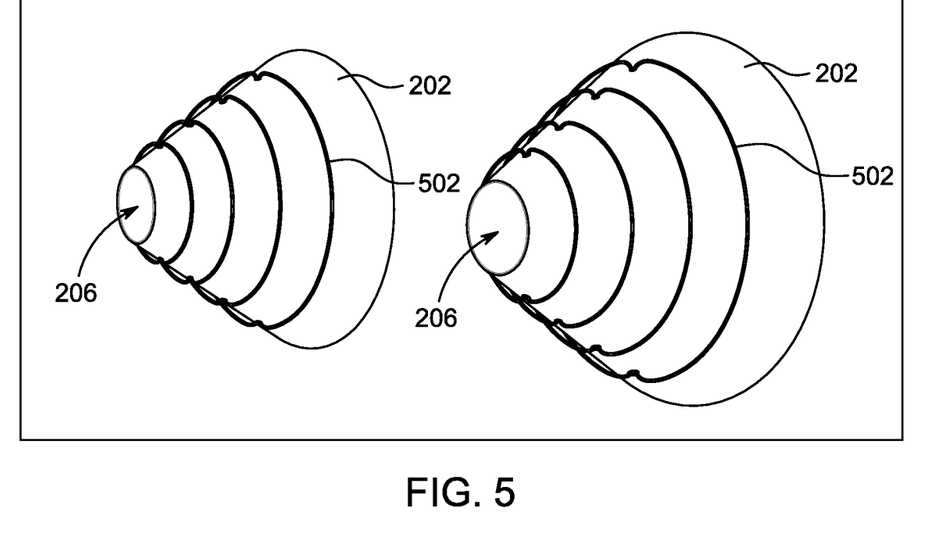
FIG. 5 is an illustration showing a second configuration of the rings of two confectionery holders of the confectionery dispensing garment in accordance with another embodiment of the present invention.

FIG. 5 is an illustration showing a second configuration of the rings 502 of two confectionery holders of the confectionery dispensing garment in accordance with another embodiment of the present invention. In this configuration, instead of a single contiguous ring, a plurality of sections are coupled together on the housing to form the ring.

Figure 6:
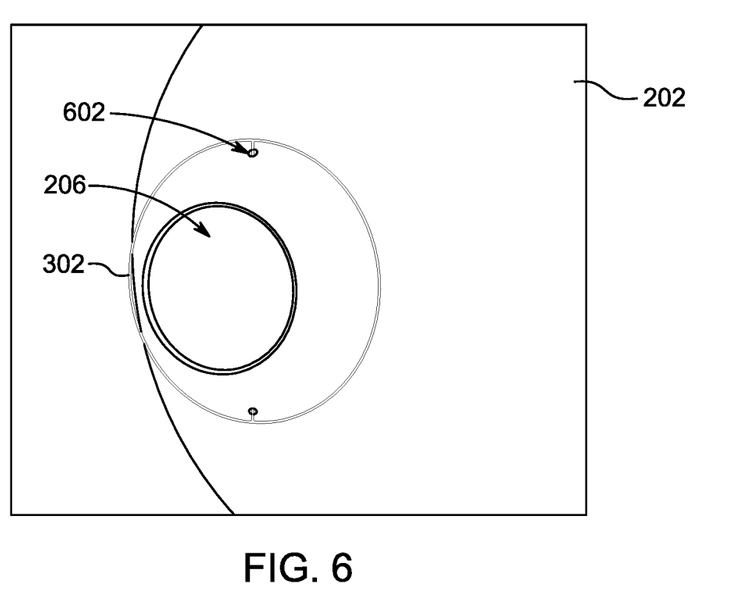
FIG. 6 is a close-up illustration of the tip of the truncated cone showing a ring and nipple opening of the confectionery dispensing garment in accordance with one or more embodiments of the present invention.
Figure 7:
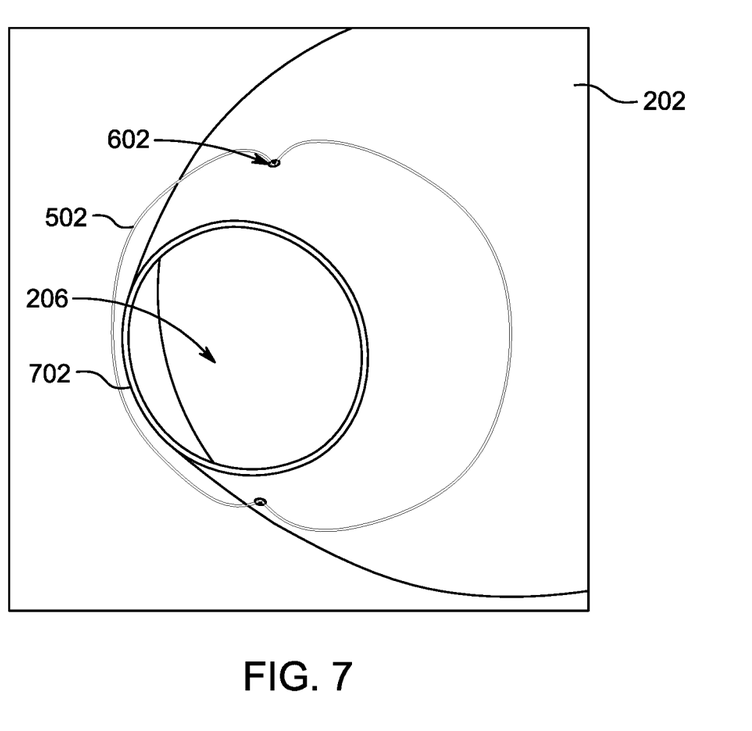
FIG. 7 is a close-up illustration of the tip of the truncated cone showing the second ring configuration and the nipple opening of the confectionery dispensing garment in accordance with one or more embodiments of the present invention.

FIGS. 6 and 7 are close-up illustrations of the tip of the truncated cone showing a ring and nipple opening of the confectionery dispensing garment in accordance with one or more embodiments of the present invention. As illustrated, each conic housing comprises nipple opening 206 at its tip (or proximal end) 702 and a plurality of anchor points 602. Each anchor point 602 could be in the form of an opening on the body of the housing, a latch point for a hook, a flap, a pocket, etc., depending on the configuration of the anchor. For instance, if the anchor is a rod, then an anchor point 602 may be a pocket. The conic housing may be made of materials such as rubber, paper, silicon, fabric, etc.

Figure 8:
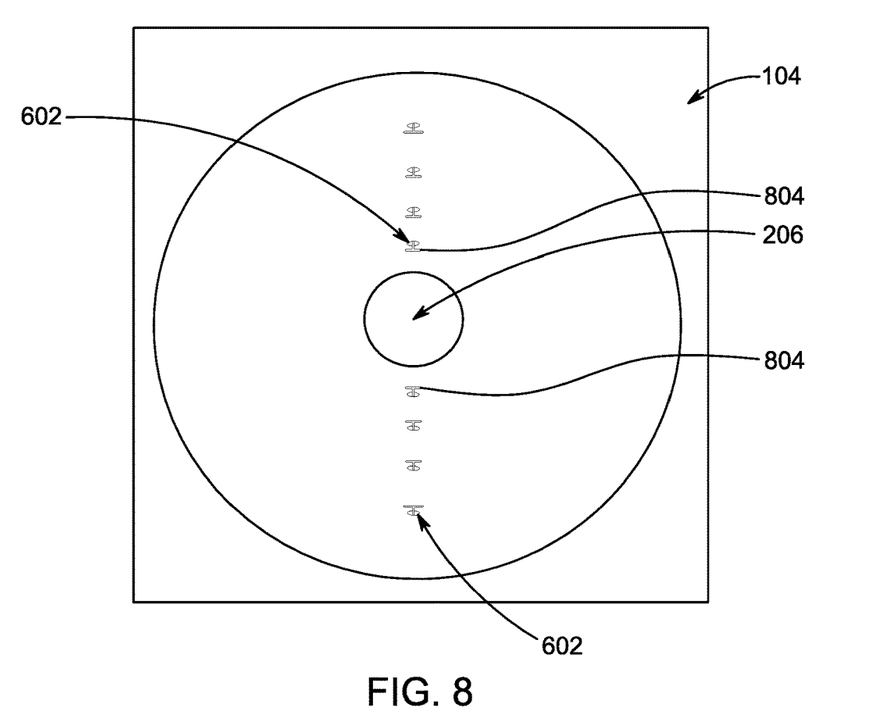
FIG. 8 is an illustration of the backside of a cone of the confectionery dispensing garment in accordance with one or more embodiments of the present invention.
Figure 9:
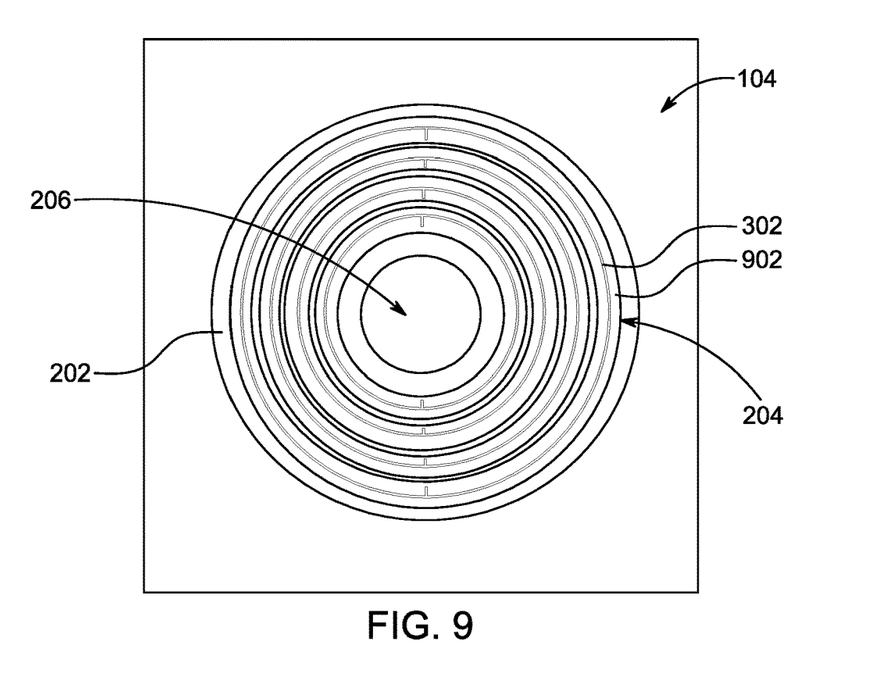
FIG. 9 is an illustration of the front side of a cone of the confectionery dispensing garment in accordance with one or more embodiments of the present invention.

FIGS. 8 and 9 are illustrations of the backside and front side of a cone 104 of the confectionery dispensing garment in accordance with one or more embodiments of the present invention. In the illustrated embodiment, each anchor 804 is secured to the inside of the truncated conic housing through an opening 602 on the housing. The illustrated example has four confectionery units coupled to the housing with each confectionery unit having two anchors for securing to the housing. Thus, there are eight opening 602 on the housing, with four on each side. Each confectionery unit is secured by two anchors, one on top and one on the bottom of the truncated conic housing. In one or more embodiments, the confectionary may be secured to the cone by a loop, tie, tab, or other securing means.

Figure 10:
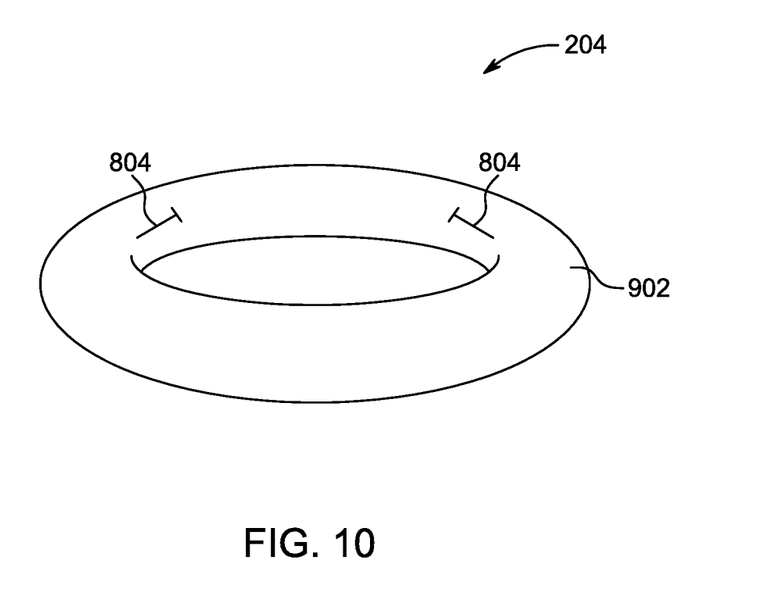
FIG. 10 is a backside perspective view of a confectionery unit of the confectionery dispensing garment in accordance with one or more embodiments of the present invention.
Figure 11:
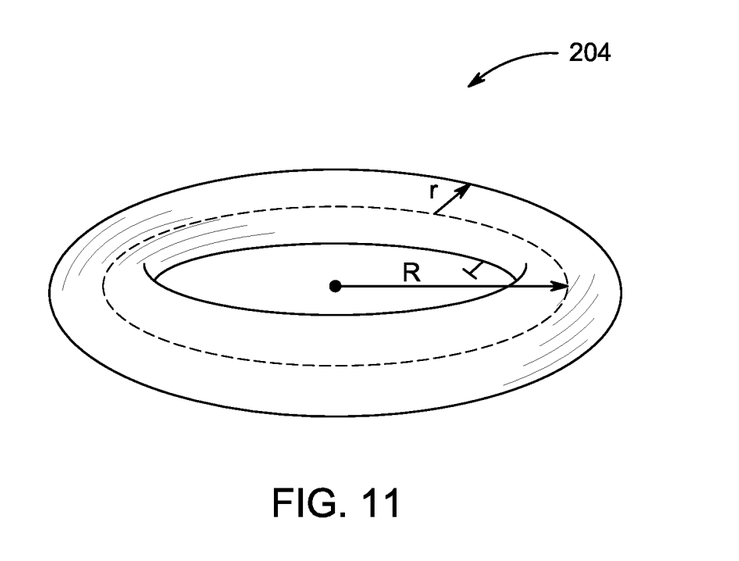
FIG. 11 is a front side perspective view of a confectionery unit of the confectionery dispensing garment in accordance with one or more embodiments of the present invention.

FIGS. 10 and 11 are perspective views of a confectionery unit of the confectionery dispensing garment in accordance with one or more embodiments of the present invention. As illustrated, each confectionary unit comprises a ring 302 with a plurality of anchors 804 and food item 902 built around the ring 302. The confectionary units are configured substantially as a torus with varying big radius "R" and approximately same small radius "r". Each ring may be made of materials such as candy, silicon, rubber, metal, thermoplastic, etc.

One or more embodiments of the invention comprises one or more confectionery holders 104, without a corresponding garment. In such embodiments, the confectionery holder may be placed directly in contact with the skin of the wearer.

While the invention herein disclosed has been described by means of specific embodiments and applications thereof, numerous modifications and variations could be made thereto by those skilled in the art without departing from the scope of the invention set forth in the claims.

What is claimed is:

1. A confectionery dispensing garment comprising:
   a garment comprising at least one cup;
   a truncated conic housing configured to fit over a cup of the at least one cup of the garment, wherein the truncated conic housing comprises a small radius opening and a large radius opening, wherein the small radius opening is sized to substantially expose a wearer's nipple when the garment and the truncated conic housing are worn; and
   one or more substantially torus shaped confectionery units removably coupled to an outside surface of said truncated conic housing, wherein each one of the substantially torus shaped confectionery units comprises a confectionery including a candy or a pastry, and an inner support ring with a plurality of arms for coupling the inner support ring to the truncated conic housing.

2. The confectionery dispensing garment of claim 1, wherein the inner support ring is reusable.

3. The confectionery dispensing garment of claim 1, wherein the confectionery is a candy.

4. The confectionery dispensing garment of claim 1, wherein the confectionery is a pastry.

5. A confectionery dispensing brassiere comprising:
   a brassiere with one or more cups shaped substantially as a truncated cone with a first small radius opening and a first large radius opening, wherein the first small radius opening is sized to substantially expose a wearer's nipple when the brassiere is worn;
   a truncated conic housing with a second small radius opening and a second large radius opening, wherein the second small radius opening is substantially the same size as the first small radius opening, wherein the truncated conic housing is configured to fit over one of the one or more cups of the brassiere such that said second small radius opening aligns with said first small radius opening; and
   one or more substantially torus shaped confectionery units removably coupled to an outside surface of said truncated conic housing, wherein each one of the substantially torus shaped confectionery units comprises a confectionery including a candy or a pastry, and an inner support ring with a plurality of arms for coupling the inner support ring to the truncated conic housing.

6. The confectionery dispensing garment of claim 5, wherein the inner support ring is reusable.

7. The confectionery dispensing garment of claim 5, wherein the confectionery is a candy.

8. The confectionery dispensing garment of claim 5, wherein the confectionery is a pastry.

9. The confectionery dispensing garment of claim 5, wherein the one or more torus shaped confectionery has varying large radius.

* * * * *